Feb. 5, 1929.  U. BELATI  1,701,222
GEAR MEMBERS
Filed March 19, 1928
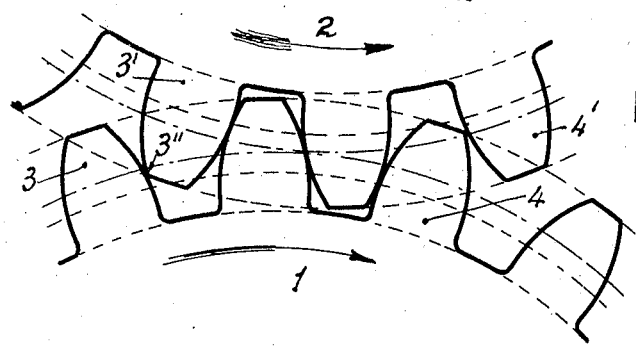
Fig.1
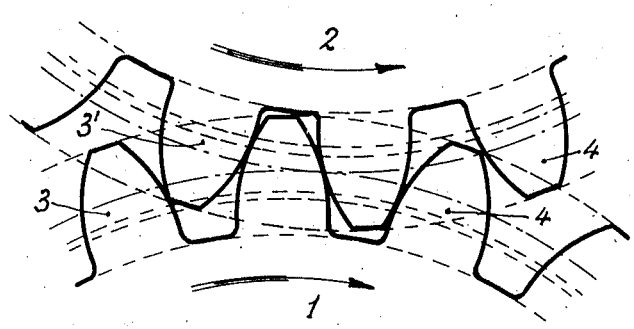
Fig.2
Fig.3
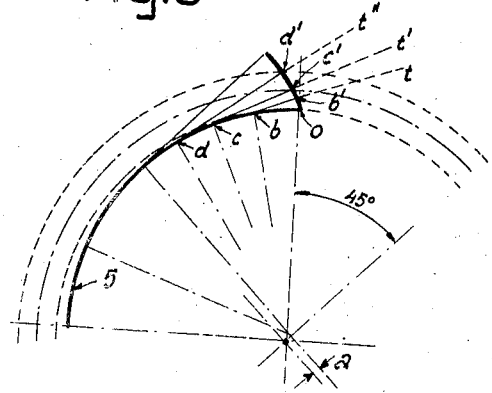
Fig.4
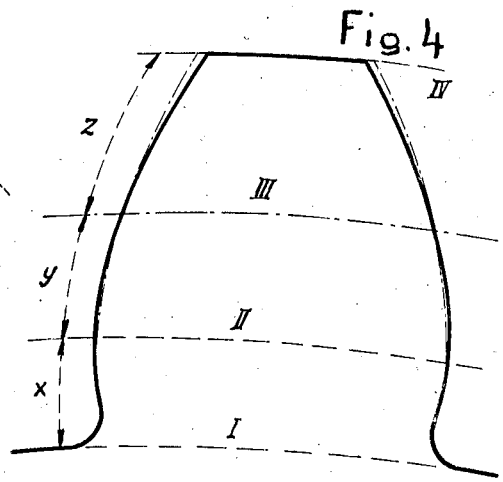
Inventor:
Umberto Belati
By
Attorney.

Patented Feb. 5, 1929.

1,701,222

UNITED STATES PATENT OFFICE.

UMBERTO BELATI, OF TURIN, ITALY.

GEAR MEMBERS.

Application filed March 19, 1928, Serial No. 262,931, and in Italy April 15, 1927.

The present invention has for its purpose to provide gear members in which teeth cannot strike or suddenly impinge on teeth of the companion member, the noise produced in known gears being thus avoided.

Such a result is secured by using, to define the teeth shape, an involute of an arc of an Archimedean spiral, with its origin on the base line of the member and evolving within said line, that is on the opposite side of said line with respect to the teeth. The profile so obtained is enclosed within a profile shaped to an involute of a circle drawn on the same base line, and it is noticeably differentiated from the latter one only in the half portion corresponding with the tooth point.

The present invention is hereinafter described in connection with toothed wheels, but it may be embodied in any kind of toothed members as racks and the like.

On the annexed drawing:—

Figure 1 shows diagrammatically the intermeshing portions of two toothed wheels having teeth shaped to an involute of a circle;

Figure 2 is a similar diagram in respect of wheels provided with teeth having a shape in accordance with the present invention;

Figure 3 illustrates the method for tracing this profile;

Figure 4 shows to a larger scale the toothed profile in accordance with the present invention when compared with a tooth or conventional profile.

In Figure 1 in which it is assumed 1 to be the driver and 2 to be the follower, the beginning of the engagement of the first pair of teeth 3—3' takes place along a line which projects on point 3'' because the body of tooth 3 meets the edge of the point of tooth 3'.

Such a fact causes tooth 3 to meet tooth 3' with the character of a shock or, in best conditions, the oil film spread on the sides of teeth is removed in register with the contact portion owing to minimum extent of the same and to very high unitary pressure operative there.

Likewise, in the last pair of intermeshing teeth 4—4 at a given time the front edge of the point of tooth 4 is in contact with the side of tooth 4' this fact also producing the removal of the lubricating film spread on the same.

In both cases the contact between two teeth produces vibrations which, as known, are the cause of noise produced by gears during their operation.

By inspecting Figure 2 which reproduces the same conditions of Figure 1 in respect of wheels in which teeth are profiled to an involute of an arc of an Archimedean spiral according to this invention, it is found that on the first contact of teeth 3 and 3' the latter one has in contact with the side of the companion one a curve portion of its side adjacent to its point, and similarly the contact of tooth 4 with tooth 4' before of its recess from the same never happens along a line edge but it takes place over a curve surface adjacent to the tooth point.

Under these conditions the sides of the two teeth come into contact with and are recessing from each other without shock and without producing an exceedingly high local pressure capable of removing the oil film and therefore the operation of a gear made in the above described manner is entirely smooth and noiseless, as experienced in tests carried out.

To obtain gear wheels having a profile shaped to an involute of an arc of an Archimedean spiral, the methods and means of general use for producing teeth shaped to an involute of a circle may be used, with the exception that instead of using a circular rim as base member for the rolling element, a rim is used having an Archimedean spiral as its directing line, said spiral thus originating from the base circle of the wheel and evolving within it.

As shown in Figure 3, to obtain the desired profile, as base arc a line 5 is assumed which is an arc of an Archimedean spiral obtained by way of approximation by tracing an arc of a circle with its centre lying on a radius at 45° with respect to the radius passing through the selected origin of the tooth profile and at a distance from the centre of the pitch circle equal to the decrement —a— of the spiral. By tracing tangents—t, t', t'' ... —at several points —b, c, d, ... —of arc 5 from its origin —o— and carrying on said tangent segments—b, b'—, —c, c'—, —d, d'— having the same length as the respective rolled out arcs —o b—, —o c—, —o d— and tracing arcs of circles with centres at —b—, —c—, —d— with radius equal respectively to —b b'—, —c c'—, —d d'— a line 6 is obtained which defines the profile of the side of a tooth.

The decrement —a— of the arc of spiral may vary in accordance with circumstances and it will be directly proportional to the diameter of the pitch circle of the wheel. By way of example in the event of a pinion having a pitch diameter of mm. 100, satisfactory results have been obtained by giving a value of about 0.80 mm. to said decrement.

In a rack said decrement is proportional to the tooth pitch.

Figure 4 shows the comparison between a tooth according to this invention shown in full line and a conventional tooth shown in dotted line, and traced as an involute of a circle.

The tooth according to this invention comprises a portion —$x$— consisting of a connecting curve as conventional, which extends from the tooth root circle I up to base circle II and then an arc —$y$— of an involute of an Archimedean spiral which coincides under practical standpoint with an involute of a circle up to the pitch circle III and then a depressed portion —$z$— enclosed within the circle-involute line up to top circle IV.

The described profile may of course be used in connection with spur wheels, bevel pinions and spiral teeth pinions, racks and so on, as well as in the manufacture of cutters for Fellows' machines for the construction of toothed wheels.

What I claim as my invention and desire to secure by United States Letters Patent is:—

1. In a gear member, a tooth whose side is profiled to an involute of an arc of an Archimedean spiral, said arc having its origin on the base line of said tooth and developing towards the root of said tooth.

2. In a gear wheel, a tooth whose side is profiled to an involute of an arc of an Archimedean spiral, said arc having its origin on the base circle of said wheel and developing within said circle.

3. In a gear member, a tooth whose side is profiled to an involute of an arc of an Archimedean spiral having a decrement proportional with the tooth pitch, said arc having its origin on the base line of said tooth and developing towards the root of said tooth.

4. In a gear wheel, a tooth whose side is profiled to an involute of an arc of an Archimedean spiral having a decrement proportional with the diameter of the pitch circle of said wheel, said arc having its origin on the base circle of said wheel and developing within said base circle.

In testimony whereof I affix my signature.

UMBERTO BELATI.